3,551,223
PYROTECHNIC HEATING DEVICE
Robert S. Deal, Los Altos, and Joseph H. Evans, Palo Alto, Calif., assignors to Raychem Corporation, Menlo Park, Calif., a corporation of California
No Drawing. Filed May 6, 1968, Ser. No. 727,074
Int. Cl. C06c 3/10
U.S. Cl. 149—15                               1 Claim

ABSTRACT OF THE DISCLOSURE

A device for heating a heat recoverable article to its heat recovery temperature comprising a shield, one surface of said shield being in contact with or near the surface of a heat recoverable article and the other surface of said shield being covered with a material capable of liberating a predetermined amount of heat energy for a predetermined amount of time substantially uniformly over the surface of the heat recoverable article.

BACKGROUND OF THE INVENTION

The principal property of heat recoverable articles that makes them unique and useful is that upon application of heat, the articles will change size, shape and dimension and return or attempt to return to some predetermined size, shape or dimension. The use of these articles finds particular utility because of the ease of installing the article over or about other devices, components, parts or shapes which are to be electrically insulated or encapsulated or in some means protected from an environment, insulated electrically or insulated from heat. Upon the brief application of increased temperature by exposure to a heat source, the articles will change size and shape and during the recovery process, tighten down around or expand out into or in some direction meet interference with the part that is to be clad or protected. Thus, this heat recovery phenomenon provides a quick, efficient and reliable technique for providing protective coatings, surfaces, claddings and insulations.

Commercially available heat recoverable parts are manufactured in the form of hollow cylindrical tubes and sleevings and in the form of molded parts. They have found commercial acceptance and utility in the field of electrical insulation and corrosion protection in cable terminations, feed through assemblies, pipe linings and coverings, identification sleeves, and many other applications. The utility of these items is based upon the fact that they are fabricated in one size and shape followed by a purposeful distortion under controlled conditions and then set in the distorted shape. Subsequent heating of these items permits a product to attempt to return to its initial fabricated size and shape.

Two methods can be used to produce these heat recoverable articles. The first consists merely of exposing a thermoplastic material to a carefully controlled amount of heat which is insufficient to allow the material to melt and flow but sufficient to allow the molecular structure to become distorted and then distorting the structure to a new configuration followed by immediate cooling or quenching of the distorted article. Subsequent increases of temperature sufficient to reduce the locked in stresses caused by the initial plastic deformation will allow the article to return to its normal shape. However, if the temperature is not closely controlled, the material will melt and flow and the article will no longer be functional.

More recently, a second phenomenon has been used to produce heat recoverable products where the disadvantages of the predescribed products are eliminated. Articles are first fabricated in the final desired size and shape and then crosslinked in this position. The crosslinking can be accomplished by the use of high energy radiation or chemical crosslinking techniques or by combinations of the two. Subsequent heating of the material will melt the crystals in a crystalline thermoplastic material or significantly lessen other internal molecular forces such as hydrogen bonding or dipole-dipole interactions to an extent sufficient to allow distortion of the product. Close temperature control is not an important factor in this type of heat recoverable material since the crosslinked material does not flow at elevated temperatures. Quenching of the heated and distorted crosslinked material will result in a product which will retain its distorted shape while at room temperature. Reheating of the product sufficient to melt the crystals and/or reduce other intermolecular forces will allow the crystalline material to quickly return the product to its initial crosslinked size and shape.

When working in remote geographical areas and on overhead lines and underground installations, the difficulty in bringing equipment and power sources to the work site may preclude the use of more conventional forms of heat such as hot air blowers, infrared lamps, etc. In such instances, particularly in the case of public utility field use, it is common to recover heat recoverable sleeves used on telephone or electrical lines, both when suspended or in the ground, by means of an open flame such as a blowtorch. The use of an open flame has several disadvantages, e.g., it is time consuming, requiring a workman to apply heat over several minutes. Additionally, the use of an open flame may result in uneven heating unless it is used by a skilled and experienced person. Furthermore, exposure to the open flame may cause charring and thus weakening in various portions of the heat recoverable material. The problem of open flame heating for heat recoverable parts which are remote from power sources has been partially solved through the use of pyrotechnic materials applied to the surface of the heat recoverable article. The use of such pyrotechnic materials is described in the copending application of Wetmore, U.S. application Ser. No. 586,954, now U.S. Pat. 3,487,118 filed Nov. 17, 1966, commonly assigned and U.S. Pat. No. 3,315,986, the disclosures of both being incorporated herein by reference.

A major disadvantage of such a coating of pyrotechnic material is that hot spots may occur in the pyrotechnic material due to non-uniform burning. These hot spots may then result in the burning of the heat recoverable material and the formation of holes. An additional difficulty with the pyrotechnic coating is that either it burns too rapidly to supply heat for the required length of time or that it burns so slowly that the application of heat and thus the degree of heat recovery is different in different parts of the heat recoverable article.

SUMMARY OF THE INVENTION

Accordingly, it is a primary object of the present invention to provide novel articles for heating a heat recoverable article to its heat recovery temperature.

Another object of this invention is to provide an article for substantially uniform application of heat to a heat recoverable article.

It is a further object of the present invention to provide an article for heating a heat recoverable article for a time sufficient for complete heat recovery in a substantially uniform manner.

Briefly, the invention comprehends within its scope a heating device comprising a shield such as metal foil which will protect a heat recoverable article from sparks and will act as a heat sink to provide a uniform distribution of heat and a coating on said shield capable of being ignited rapidly over the entire area of the shield and supplying heat for a time sufficient to cause substantially complete recovery of the heat recoverable member. A two-layer pyrotechnic material may be used, one layer which burns rapidly to thereby result in rapid ignition over the entire surface of the shield and a second layer which burns slowly to thereby supply heat for the time necessary for complete recovery of the heat recoverable article.

DESCRIPTION OF PREFERRED EMBODIMENTS

The heat recoverable articles which may be heated by the heating device of the present invention include articles of any shape and for any purpose made from heat recoverable material. These articles are frequently tubular in shape. Tubular, as used in this disclosure, refers to any article which is capable of recovering over some object and thus tubular encompasses all articles which are generally cylindrical in shape although these articles may have cross sections which are rectangular, or any other shape, in addition to circular. Furthermore, the articles may have a cross section which varies along its length, may be closed at one end and may be shaped so that one portion of the article forms only one tube whereas another portion of the article comprises several individual tubes.

In addition to tubular shapes, the heat recoverable articles may be in the forms of strips, tapes, sheets, plugs, dowels, etc. Besides recovering over an object about which the heat recoverable article was placed, the heat recoverable article may be an expandable article which will plug a hole into which it is placed upon the application of heat. Furthermore, the heat recoverable articles may include springs such as those described in Wetmore U.S. application Ser. No. 499,922, filed Oct. 12, 1965, now U.S. Pat. 3,396,460 and commonly assigned, the disclosure of which is incorporated herein by reference. Also, the heat recoverable articles may contain various inserts such as solder, mastic, and grease as described in U.S. Pat. Nos. 3,243,211 and 3,297,819, and U.S. application Ser. No. 391,090, filed Aug. 21, 1964 by Heslop, now U.S. Pat. 3,415,287 and commonly assigned, the disclosures of which are incorporated herein by reference. Additionally, the heat recoverable article may be a combination of an expandable and a retractable heat recoverable article. Thus, it can be seen that any type of heat recoverable article may be heated by the device of the present invention.

All types of heat recoverable materials may be used to form the heat recoverable articles to which the present invention applies. A common source of heat recoverable material is polymeric material having the property either of elastic or plastic memory. Polymeric materials which are suitable include any material capable of being crosslinked so that it will possess the property of elastic memory. Typical materials which can be crosslinked include polyolefins such as polyethylene. In addition, various ethylene copolymers may be employed, e.g., copolymers of ethylene and vinyl acetate, ethylene and ethylacrylate, etc. Other polymers which may be used include polyvinyl-halides, e.g., polyvinylchloride; polyvinylidene halides, e.g., polyvinylidene fluoride; polyacrylates; polyamides, e.g., nylon; polyesters; and other materials such as polyurethanes, ionomers, etc.

The heating device of the present invention contains a shield which protects the surface of the heat recoverable material adjacent to the heating device. The shield functions to prevent the application of excess heat to localized areas of the heat recoverable material due to the development of hot spots in the heat generating material of the heating device. For example, with pyrotechnic heating materials, hot sparks may be formed which would tend to burn and even penetrate the heat recoverable material in the absence of a shield. Furthermore, the shield may comprise a conductive material which acts as a heat sink and functions to evenly distribute the heat over the surface of the heat recoverable article.

In one embodiment of this invention, the heat shield has the same general shape as the heat recoverable article with which it is to be used. For example, in the case of a heat recoverable tube, the shield has an inner diameter which is slightly larger than the outer diameter of the tube so that the shield fits snugly around the heat recoverable article. The shield need not fit closely about the heat recoverable article although it is necessary that the shield be close enough to the article so that the air gap between the shield and the heat recoverable article will not insulate the heat recoverable article from the heat generated by the heating device. Of course, it is important that the shield be positioned on the heat recoverable article so that it is approximately the same distance from the heat recoverable article over the entire surface of the heat recoverable article. Thus, if a tubular shield is placed over a tubular heat recoverable article, the inner diameter of the shield should not be so much greater than the outer diameter of the heat recoverable article that the shield will be in contact with the recoverable article at one point and so far away from it at another point that no heat is transferred from the shield to the heat recoverable article. In general, it is preferred that the shield is only slightly bigger than the heat recoverable article so that it can be easily placed over the heat recoverable article.

The heating device shield may also have other shapes such as a sheet or tape which is placed into contact with or wrapped around the heat recoverable article. The tape may be in the form of a long rectangle or may be in spiral form obtained by the helical cutting of a tube. In applying a tape to a heat recoverable member, the tape may be wound in any desirable manner including a spiral wrap.

The heat shield may be constructed from any suitable material which will shield the surface of the heat recoverable article from excessively hot portions of the heat generating material used in the heating device, and which will not prevent the transfer of heat to the heat recoverable article. Suitable materials from which the shield may be fabricated include metal foils such as foils of aluminum, copper, brass, beryllium-copper alloys, etc. Furthermore, the shield may be formed by the application of a liquid coating either to the outer surface of the heat recoverable article or to the surface of the heating device and allowing the coating to dry. Such liquids may include metal sprays, heat resistant paints, etc. The paints may have conductive materials included in them although, in general, it is only necessary that the shield transmit infrared energy. The heat shield may be constructed of material which will melt or decompose providing it first performs its shielding function.

The shield may also be fabricated from various temperature resistant polymeric materials such as polyamides. Additionally, ceramic or metal filled ceramic, glass cloth, etc., may be used.

Portions of the shield may comprise non-conductive materials in those cases where it is desired that portions of the heat recoverable article not be subjected to the application of heat.

One side of the shield is covered with a heat generating material. Typical heat generating materials are those disclosed in U.S. Pat. No. 3,315,986 and Wetmore U.S. application Ser. No. 586,954, filed Oct. 17, 1966 now U.S. Pat. 3,487,118. The burning or heat generation should be rapidly propagated so that when one portion of the material is ignited, all portions of the material will soon become ignited. Rapid propagation of heat generation will insure substantially uniform application of heat to all parts of the article during recovery as well as avoiding the inconvenience of excessive amounts of time required for application of the heat recoverable article. Additionally, the generation of heat should be sustained over a period of time long enough for complete recovery of the heat recoverable article. These criteria can be satisfied by using a two or more layer coating of heat generating material. In the case of the two layer coating, one coating ignites or propagates heat generation rapidly and a second coating generates heat relatively slowly.

In using a device with two layers of heat generating material, the generation of heat, initiated in one portion of the device, is rapidly propagated in one layer so that in a short time heat is applied to the entire recoverable article. As the generation of heat is propagated in the fast burning layer, it will cause ignition of the adjacent slow burning layer which will then generate heat for a period of time sufficient to cause recovery of the article. Ignition of the entire heating device should occur within a very short time, e.g., preferably less than one minute. Of course, it can be seen that the time is not critical because the generation of heat could be initiated in various parts of the article, e.g., igniting various parts of the heating device with a match. However, for convenience in field use, it is desirable to have a heating device which requires initiation of heat generation at only one point.

The rapid heat propagating layer may be one which is activated by the application of a flame or it may be composed of material which is activated by the application of water or some other chemical to initiate an exothermic chemical reaction. In the case of a burning or pyrotechnical material, it is preferred that the rapid burning layer contain a fibrous material such as cellulose, rayon, or other polymeric material which will burn. It has been found that paper towel material impregnated with potassium nitrate is particularly effective. By making the cross section area of the fibers small and using a low density material, the rate of burning of the layer can be increased. Such a high surface area fibrous material will ignite and supply heat as well as aiding in the propagation of the ignition of the pyrotechnic material. The fibrous material may be impregnated with the pyrotechnic material by dipping in solution, spraying, painting, etc. The fibrous material is normally impregnated with oxidizing materials such as nitrates including the sodium, potassium, barium, strontium salts, etc.; chlorates; perchlorates; manganese dioxide; gun powder formulations in general; etc. If desired, the fibrous material alone may be used if it will burn at a rapid enough rate and without a flame.

The slow heat generating layer may be composed of similar materials as those present in the rapid heat generating layer. An effective slow burning layer is cotton containing cloth impregnated with potassium nitrate. A slower heat generation may be obtained by including a filler or other material which will prevent rapid burning or heat generation.

In general, it is desirable that the slower burning or heat generating layer contain some structural rigidity such as that supplied by cloth, metal screen, glass fibers, etc. By providing a cloth having low surface area, e.g., large fiber size and a dense weave, a slow burning layer can be provided. Suitable cloth or fibrous material includes those fibers which will burn such as cotton and rayon. A metal screen may be used in place of the cloth in either the slower or faster burning layer. Such a screen would provide a heat sink which would radiate heat for a longer time than the cloth.

Generally, it is preferred to have the slow burning layer as the outer layer with the fast burning layer between the slow burning layer and the shield. The slow burning area tends to retain its structural strength for a longer period of time thus holding the heat generating material in place. However, if desired, a layer of material such as foil, fiber glass screening, fabric, etc., may be placed over the outer layer of the heating device and thus the rapid burning material could be on the outside of the slow burning layer and held in place by an additional layer which would add structural strength. Furthermore, a rapid burning layer which retains its structural strength could be used.

It is usually desirable to bind the heat generating materials to the heat shield. The attachment may be accomplished by mechanical means such as stapling or sewing or through the use of an adhesive such as wheat paste, water soluble polymer such as polyvinyl alcohol, etc.

In fabricating the heating device of this invention, the heat shield may be first formed by wrapping around a mandrel or wrapping it directly around the heat recoverable part. Of course, the invention also contemplates heating devices in the forms of sheets and tapes and in that case, no forming is necessary. After formation of the shield, the heat generating material may be applied in various forms. If impregnated cloth or fibers are used to form the various layers of heat generating material, the cloth may be simply impregnated with a binder and wrapped around the shield. Alternatively, the heat generating material in the form of a paste may be applied to the surface of the shield. In general, any desirable means of fabricating the heating device having various layers of material may be used.

In another embodiment, the heat recoverable article and the heating device may be formed as an integral unit. This may be accomplished by simply placing the heating device over the heat recoverable article and joining them with an adhesive if the heating device cannot be held to the heat recoverable article by friction. Furthermore, the heat recoverable article may be expanded so that it comes into contact with the walls of the heating device. For example, a process for the formation of heat recoverable tubing involves first extruding the tubing and then expanding the tubing by the application of heat and pressure within the tubing. An integral heating device and recoverable tubing can be formed by formation of a tubular heating device at the die used to extrude the heat recoverable tubing and subsequent expansion of the tubing against the inner wall of the tubular heating device.

In using the heating device of this invention, it is necessary only to place the device with its shield in contact with or near a heat recoverable article. Then, heat generation is initiated by application of a flame such as a match, or the addition of a chemical which will cause the heating device to undergo an exothermic reaction. An advantage of the device of this invention is that once the reaction is initiated, attention is not required, thus freeing the workman applying the heat recoverable article for other work. If an open flame using a torch were applied, at least one torch operator would be necessary for the entire period required for the article to heat recover.

It is generally desirable that the rapid burning layer of the two-layer heat generating material of this invention be the one in which heat generation is first initiated. This can readily be accomplished, even when the rapid burning layer is between the shield and the slow burning layer by applying the initiator at an edge of the heating device where the rapid heat generating layer is exposed. Additionally, other means such as fuses or exposed areas at various other points of the heating device may be employed to insure that the initiator contacts the rapid burning layer.

The invention is further illustrated by the following examples wherein all percentages are by weight unless otherwise specified.

EXAMPLE 1

A single layer of aluminum foil was wrapped around a 0.87 inch mandrel and then covered with three layers of single ply bleached kraft paper toweling approximately 0.008 inch thick, commercially available as "Crown Manu-Towel," and one layer of a blend of 70% rayon, 30% cotton weighing approximately 8 oz./sq. yd., approximately 0.021 inch thick with approximately 28 ends per inch and 14 picks per inch, commercially available as "windjammer" fabric, that had been dipped in the following mixture:

| | Percent |
|---|---|
| Potassium nitrate | 13 |
| Wallpaper paste (wheat paste) | 4 |
| Water | Balance |

After drying in an air circulating oven, the assembly was removed from the mandrel and placed over a section of TCS-350, a commercially available heat shrinkable crosslinked polyethylene tubing having an I.D. of 0.8 inch and containing a mastic adhesive coated on the inner surface. A 4 inch long sample was placed over a 0.5 inch mandrel and ignited with a match at one end. Ignition along the 4 inch length occurred within 15 seconds, burning of the cloth continued for two minutes. The maximum temperature in the mastic was found to be 125° C. After removal of the foil and residue, it was observed that the tube was clean, unburned, and had shrunk down snugly on the mandrel.

EXAMPLE 2

Samples of 4 ply unbleached kraft paper toweling weighing 2–3 oz./sq. yd., commercially available as "Kimtowel" and a cloth, 100% cotton, Cannon "Huck Toweling" weighing 5–6 oz./sq. yd., were dipped in the following mixture:

|  | Percent |
|---|---|
| Potassium nitrate | 15 |
| Commercial sodium silicate solution (41° Bé.) | 8 |

The excess solution was gently squeezed out, and the samples dried in an air circulating oven. Composition of the samples was approximately:

| Paper: | Percent |
|---|---|
| Paper | 60 |
| Dried solution | 40 |
| Cloth: |  |
| Cloth | 70 |
| Dried solution | 30 |

An assembly was made from layers piled up in the following order:

Aluminum foil
Cloth (impregnated)
Paper (impregnated)
Cloth (impregnated)
Fiber glass window screening This assembly was wrapped around a heat shrinkable tube of the type used in Example 1 with the foil side in and the edges stapled together. The tube was placed over a mandrel and, upon ignition, burning occurred for about two minutes. The recovered tube was clean, unburned and had shrunk down snugly over the mandrel.

The foregoing examples are merely illustrative of the invention and should not be taken as limiting the scope of the invention in any way. Thus, it can be seen that both the recoverable article and the heat generating device may have essentially any form desired. Furthermore, a wide range of materials may be used for the shield. It is only necessary that these shield materials will prevent burning of the heat recoverable material due to hot spots in the heat generating material. A single layer of heat generating material of any type may be employed although the two layer construction provides a method of obtaining the desired burning properties. The heat generating material may again be any material which will generate heat sufficient to cause shrinkage of the heat recoverable member. Thus, it can be seen that the scope of this application is limited only by the lawful scope of the appended claim which follows.

We claim:

1. A device for heating a heat-recoverable member to its heat-recovery temperature comprising a tubular shield of metal foil, a first layer of heat generating composition on the outer surface of said shield, said first layer comprising paper impregnated with a pyrotechnic composition, and a second layer of heat generating composition on the outer surface of said first layer, said second layer comprising cotton-containing cloth impregnated with a pyrotechnic material.

References Cited
UNITED STATES PATENTS

| 2,739,829 | 3/1956 | Pedlow et al. | 156—86X |
| 2,992,457 | 7/1961 | Harrison | 156—86X |
| 3,235,289 | 2/1966 | Jones | 156—86X |
| 3,276,929 | 10/1966 | Ferch | 156—86X |
| 3,419,291 | 12/1968 | Tomb et al. | 156—86X |
| 2,977,885 | 4/1961 | Perry et al. | 149—15X |
| 3,056,701 | 10/1962 | Fritzlen | 149—15X |
| 3,294,602 | 12/1966 | Francis et al. | 149—15X |

CARL D. QUARFORTH, Primary Examiner

S. J. LECHERT, Jr., Assistant Examiner

U.S. Cl. X.R.

102—23; 149—14; 161—220, 268; 285—21